United States Patent [19]

Sakamoto et al.

[11] Patent Number: 4,757,181

[45] Date of Patent: Jul. 12, 1988

[54] WEIGHING APPARATUS

[75] Inventors: Kazuho Sakamoto, Soraku; Takao Shitaya, Yamatokouriyama; Makoto Mihara, Osaka, all of Japan

[73] Assignee: Matsushita Electric Industrial Co., Ltd., Kadoma, Japan

[21] Appl. No.: 884,892

[22] Filed: Jul. 14, 1986

[30] Foreign Application Priority Data

Jul. 15, 1985 [JP] Japan .................. 60-155407

[51] Int. Cl.⁴ .............................. H05B 1/02
[52] U.S. Cl. .................. 219/393; 219/10.55 B; 219/10.55 E; 219/391; 177/210 C
[58] Field of Search .................. 219/10.55 B, 10.55 E, 219/10.55 R, 391, 392, 393; 177/210 C

[56] References Cited

U.S. PATENT DOCUMENTS

| 4,237,989 | 12/1980 | Lewis | 177/210 C |
| 4,381,040 | 4/1983 | Brouwer | 177/210 C |
| 4,390,768 | 6/1983 | Teich et al. | 219/10.55 E |
| 4,582,152 | 4/1986 | Gibbons | 177/210 C |

FOREIGN PATENT DOCUMENTS

| 49-983 | 1/1974 | Japan . |
| 49-19875 | 2/1974 | Japan . |
| 49-10366 | 3/1974 | Japan . |
| 50-138864 | 11/1975 | Japan . |
| 59-918 | 1/1984 | Japan . |
| 59-94028 | 5/1984 | Japan . |

Primary Examiner—A. D. Pellinen
Assistant Examiner—Leon K. Fuller
Attorney, Agent, or Firm—Cushman, Darby & Cushman

[57] ABSTRACT

A heating oven has a weighing apparatus, and a weight of a food material placed on a tray in a heating cavity is conveyed by Roberval mechanism. The conveyed weight is measured by the weighing apparatus, and the heating oven controls heating time, heating power and the like responding to the measured weight of the food stuff.

22 Claims, 14 Drawing Sheets

WEIGHING APPARATUS

FIELD OF THE INVENTION AND RELATED ARE STATEMENT

1. FIELD OF THE INVENTION

The present invention relates to a weighing apparatus for measuring the weight of an object, and more particularly relates to a weighing apparatus which is combined with a heating oven and the like for controlling the heating power so as to cook a food material in the most suitable condition by measuring its weight.

2. DESCRIPTION OF THE RELATED ART

In a conventional heating oven shown in FIG. 1, at first a user measures a weight of a food material, and inputs the measured information (weight) by operating a keyboard 1a. The heating oven automatically controls a suitable heating time, heating power, heating mode and the like using such measured weight. FIG. 2 is an enlarged perspective view showing a control part 1 and display of the conventional heating oven shown in FIG. 1. The control part 1 comprises an indicator 2 for indicating the input measured weight of the food material, the heating time, the heating power or the like, selection keys 1a for selecting a kind of food or cooking menu, and numeral keys 1b for inputting cooking time and weight of the food material.

Cooking operation using such conventional heating oven requires the extra user step of measuring the weight of the food material before putting the food material into a heating cavity, and inputting the measured weight of the food material by operating the numeral keys 1b. A problem exists in this apparatus when the weight is entered incorrectly, due to incorrect measuring of the weight or an incorrect value being input by a mis-operation. Furthermore, when a very large value is mis-input instead of a very light weight of the food material, there are problems that the food material can over-heat causing combusted, and the heating oven to be damaged.

OBJECT AND SUMMARY OF THE INVENTION

The object of the present invention is to improve the above-mentioned problems and to provide an improved heating oven without failure of cooking due to the mis-operation of input data such as heating time and weight of the food material.

A weighing apparatus in accordance with the present invention comprises, a tray for holding an object to be weighed thereon, a force-measuring device comprising a resilient member having a first electrode to be moved thereby and a second electrode which is disposed with a given gap against and insulate from the first electrode, a linkage for conveying a force induced by and responding to weight of the object onto the resilient member to induce a displacement of the first electrode, and a capacitance measuring circuit for measuring capacitance between the first electrode and the second electrode.

DESCRIPTION OF THE PREFERRED EMBODIMENTS

A preferred embodiment of the present invention is described in the following with reference to FIG. 3.

Figure 1:
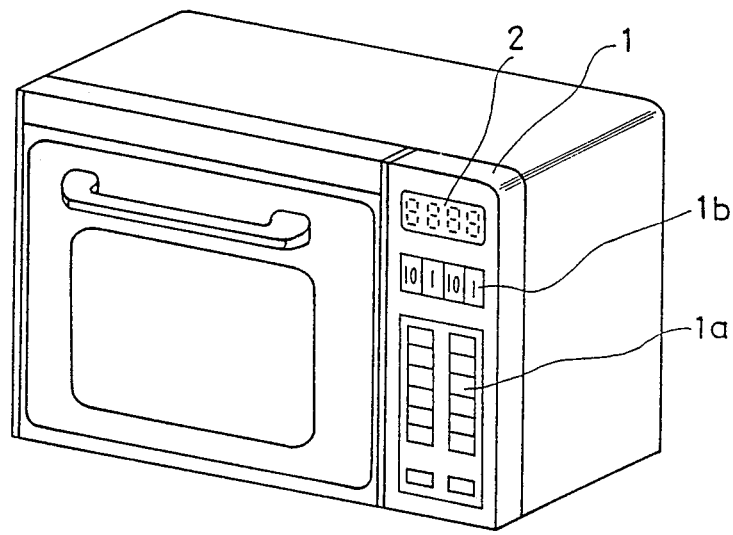
FIG. 1 is the perspective view showing the conventional heating oven.
Figure 2:
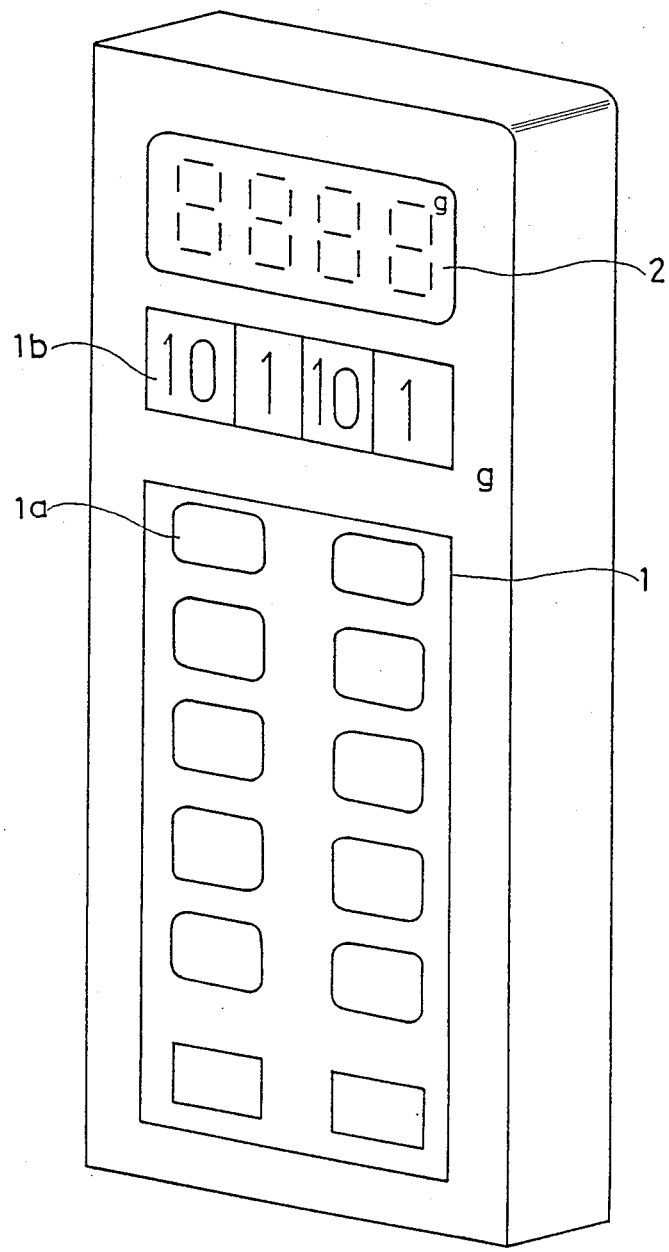
FIG. 2 is the enlarged perspective view showing the control part of the conventional heating oven.
Figure 3:
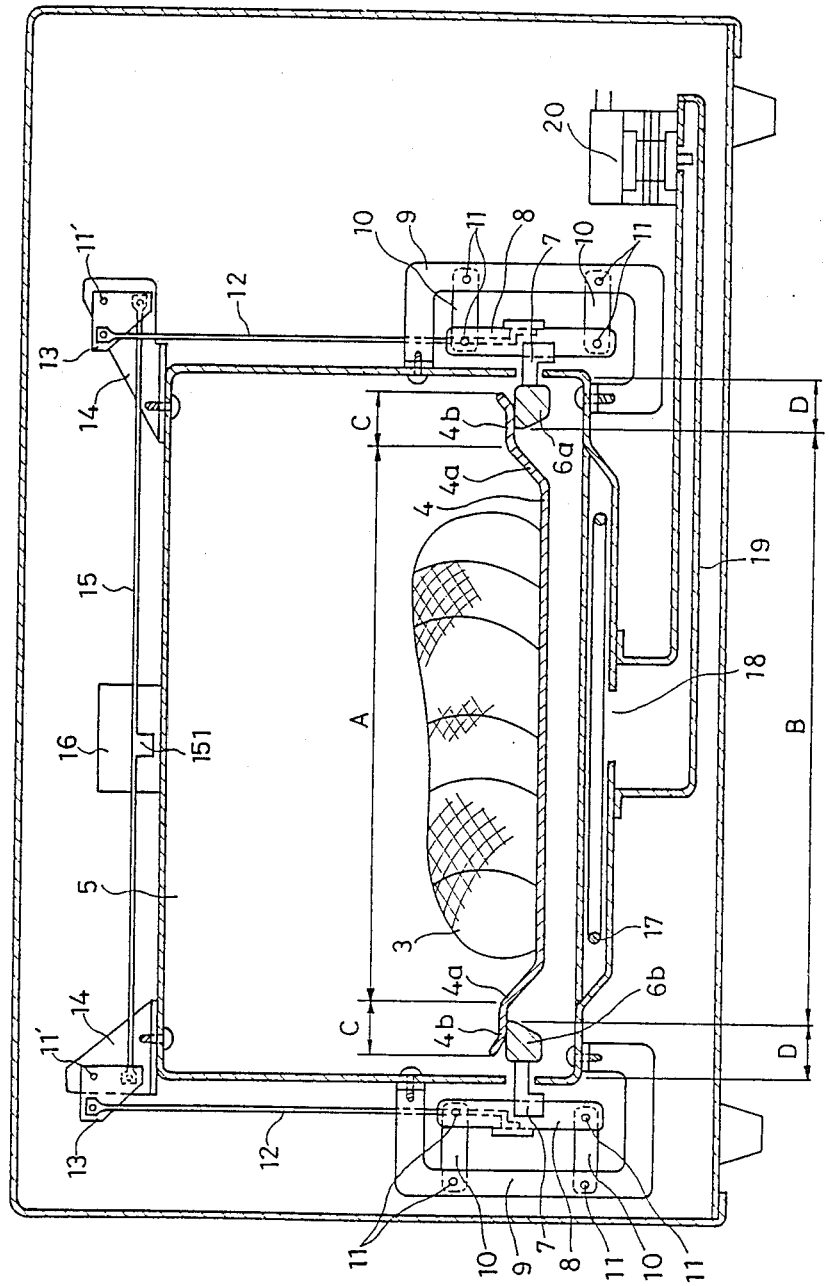
FIG. 3 is a cross-sectional front view of a heating oven having a weighing apparatus in accordance with the present invention.

FIG. 3 shows a cross-sectional front view of a heating oven having a weight measuring apparatus in accordance with the present invention. A food material 3 is placed on a tray 4 and put into a heating cavity 5. The tray 4 is put on rails 6a and 6b on the right and left side of the heating cavity 5. Both right and left rails 6a and 6b are disposed along the side walls of the heating cavity 5 to extend from the front to the back part thereof. The tray 4 can slide on the rails 6a and 6b, and is taken out fron or into the heating cavity 5. The weight of the food material 3 and the tray 4 is imposed on the rails 6a and 6b, and is transmitted to an outside part of the heating cavity 5 by coupling members 7 which is disposed in through holes of the side walls of the heating cavity 5. Such coupling members 7 need to be made by a material which is not affected by microwaves when the oven is a microwave oven. The coupling members 7 also serve to shield microwave leakage to an external part of the heating cavity 5. The weights are transmitted by the coupling members 7, and further by a link mechanism which is called a Roberval mechanism. Such Roberval mechanism constitutes a parallelogram, one side of the parallelogram being fixed and the opposing side moving to retaining the parallelism. Namely, the parallelogram can be seen in FIG. 4, and constituted by a vertical rod 8, a vertical holder 9 and two link members 10, and such elements are rotatably connected by coupling pins 11 on the four corners of the parallelogram. The holders 9 are fixed on the external side wall of the heating cavity 5, and the rods 8 are disposed to oppose the side walls of the heating cavity 5 so as to be able to move in parallelogram. The coupling members 7 are respectively fixed on the rods 8. The weights are vertically transmitted to an upper part of the heating cavity 5 via the rods 8, and the vertical rods 12. The weights transmitted from the right and left sides of the heating cavity 5 are transformed into a force having a horizontal direction by converters 13, and by horizontal rod 15. The converters 13 are respectively rotatably held on holders 14 and 14 by pins 11' and 11', and link the vertical rod 12 and the horizontal rod 15, each having angles with one another of about 90°. The force transmitted from both sides of the heating cavity 5 are concentrated on the horizontal rod 15, and the concentrated force is charged from left to right in FIG. 3 to a weight measuring unit 16 for measuring such force on the horizontal rod 15.

A heater 17 can be disposed below the heating cavity 5 as a heating source, so that effective and well thermally distributed cooking can be practiced. For example, the tray 4 is made of a metal plate and heated from below by the heater 17, heat is transmitted to the food material 3, passing through the tray 4. As heater 17 is disposed below the tray 4, the whole of the heating cavity 5 is heated by convection and heat distribution of the heating cavity 5 is uniform. Accordingly, the food material 3 is wholly heated, and the result of cooking is very good.

In the case of heating by microwave, a supply route 18 of the microwave can be disposed below the heating cavity 5, and the supply route 18 is connected with a magnetron 20. In this case, the tray 4 is made of a ceramic or glass material and the microwave is emitted to the lower part of the food material 3. Accordingly, the food material 3 is heated from below, and especially in the case that the food stuff 3 is fluid, convection occurs and the food stuff is uniformly and effectively heated. As mentioned-above, such embodiment can be made as that having the heater 17 or microwave supply route 18 as a heat source, and thermally effective cooking can be made without fear of non-uniform heating.

In the above-mentioned embodiment, when the food material 3 is put on the tray 4, a displacement or transformation is made in the parts the force is imposed on, and the position of the tray 4 is slightly lowered. Therefore, it is necessary to leave a sufficient vertical room below the tray so that the bottom of the tray 4 reached the bottom of the heating cavity 5 only when a designed maximum weight if placed thereupon.

In the above-mentioned configuration, the tray 4 needs to be stably put on the rails 6a and 6b, and also to be able to easily be taken out and put into the heating cavity 5. Accordingly, the below-mentioned configuration is needed. Offset or step parts 4a are formed on the peripheral part of the tray 4 for limiting the horizontal position of the tray 4, and to enable putting it into the heating cavity 5 along the rails 6a and 6b. Furthermore, horizontal blim parts 4b are formed outside the offset parts 4a for stable lying on the rails 6a and 6b. Then, for putting the tray 4 on the rails with stability, the distance A between both offset parts 4a and the distance B between both rails 6a and 6b are to be as $A<B$. If the relation $A<B$, holds the horizontal blim parts 4b can be stably held on the rails 6a and 6b, and the tray 4 becomes stable. If the relation $A>B$ holds, one of oblique part of the offset part 4a is over one of the rails 6a or 6b and the tray 4 may be inclined and unstable.

Next, for preventing a drop out of the tray 4 off the rail 6a or 6b, the distance A and the width of one blim part 4b, the length $A+C$ shown in FIG. 3 and the distance B are determined as $(A+C)>B$. If the relation is $(A+C)<B$, the tray 4 may drop out from the rails 6a and 6b. Further, if one of the blim part 4b touches the side wall of the heating cavity 5, the weight measuring may be disturbed and a precise measurement might not be obtained. Therefore, to prevent such touching of the blim part 4b on the side wall of the heating cavity 5, the distance D from the contact part of the rail 6a or 6b to the side wall of the heating cavity 5, and the width C of the blim part 4b are set to be $D>C$. When the distance and width from A to D in FIG. 3 are set as mentioned above, the tray 4 is stably put on the rails 6a and 6b, and precise weight measuring can be practiced. Also, the taking out and putting in the tray 4 from and to the heating cavity 5 can be smooth.

Figure 4:
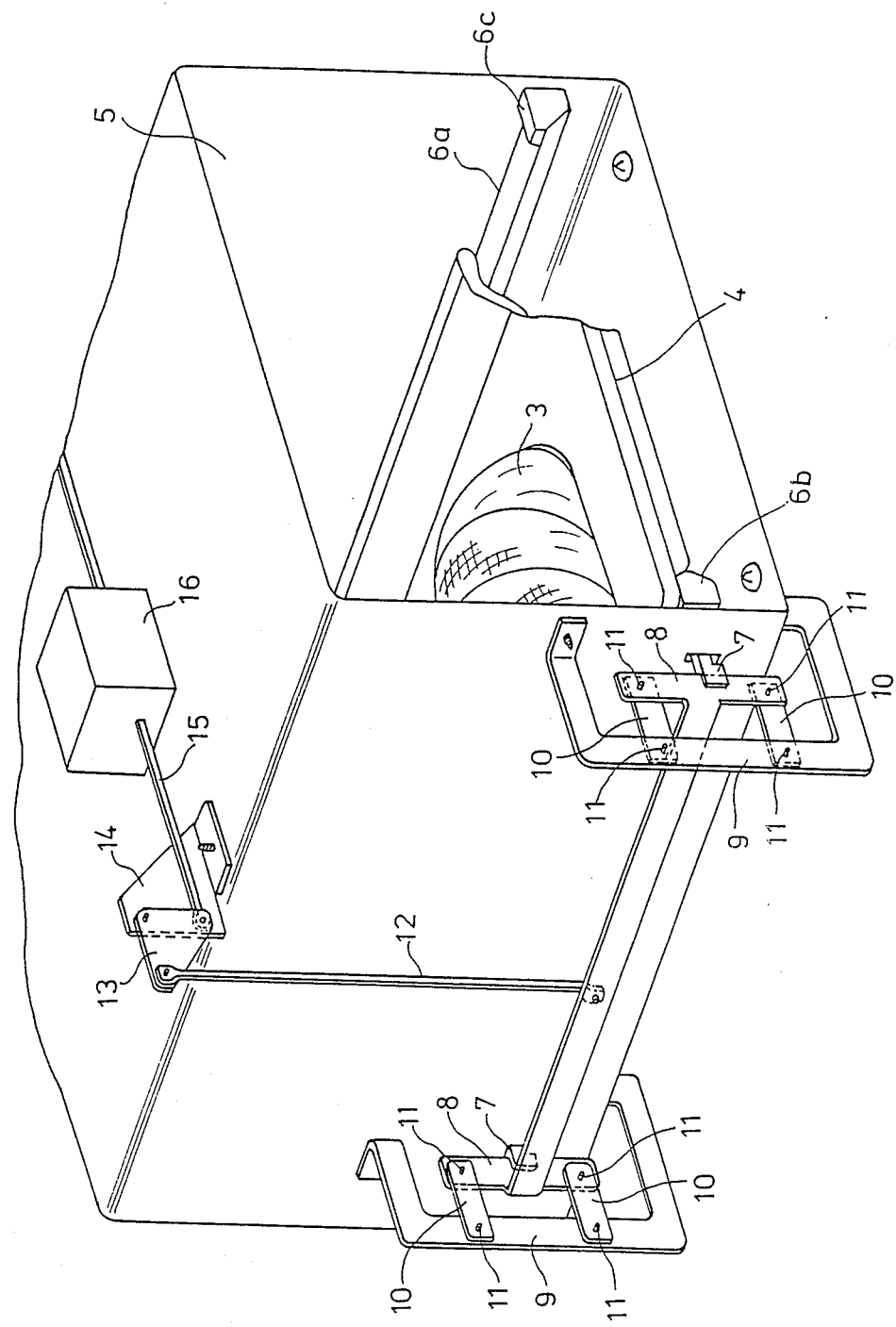
FIG. 4 is a perspective view of the principal part of the weighing apparatus in accordance with the present invention.

FIG. 4 is a perspective view showing the principal part of the heating oven having the weight measuring apparatus in accordance with the present invention. In FIG. 4, the food stuff 3 is placed on the tray 4, and the weight of the food stuff 3 is charged on the rails 6a and 6b. The rails 6a and 6b on both side walls of the heating cavity 5 are disposed along the side walls from the front part to the back part. The tray 4 can slide the rails 6a and 6b and can be taken out from or put into the heating cavity 5. The rails 6a and 6b are supported at two points, in the front part and the rear part, by the coupling members 7 and by two Roberval mechanisms. The rods 8 of the front and rear Roberval mechanisms are formed in one piece, and an intermediate position of such rod 8 is hangs from a vertical rod 12, at each outside area of the heating cavity 5. The forces transmitted by the two vertical rods 12 on both sides of the heating cavity 5 (one of which is not shown in FIG. 4) are concentrated on the horizontal rod 15 and the concentrated force is measured by the weight measuring unit 16.

In the above-mentioned configuration, if the tray 4 is deeply put into the heating cavity 5, the tray 4 may collide with a rear wall of the heating cavity 5, and the tray 4 or the rear wall of the heating cavity 5 may be broken. If the tray 4 is not fully put into the heating cavity 5, the tray 4 may collide with an inner side of the door (which is not shown in FIG. 4), and the tray 4 or the door may be broken. Also, when the tray 4 contacts the rear wall of the heating cavity 5 or the door, a precise measuring of the weight is not impossible.

Figure 5:
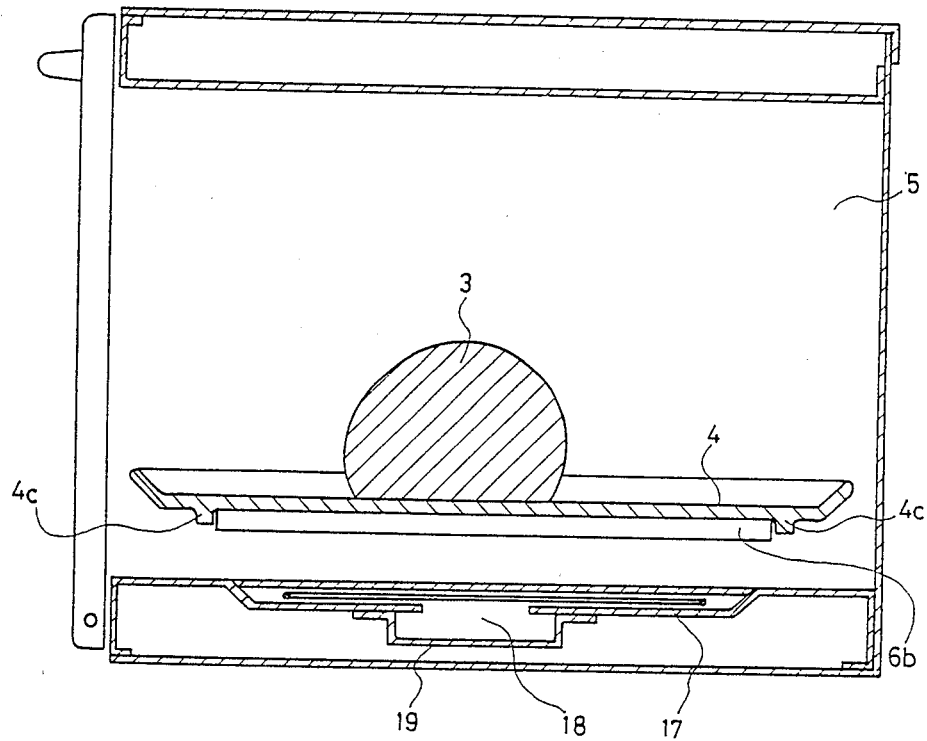
FIG. 5 and FIG. 6 are partial cross-sectional side views of the heating oven, respectively.

In order to prevent the above-mentioned problems, offset parts in the direction, along the side walls or rails, are formed on the tray 4 and the rails 6a and 6b, which limit the position of the tray 4 along the rails 6a and 6b. FIG. 5 shows an embodiment in which the tray 4 has convex parts 4C and 4C on its front and rear peripheral areas, and is limited with regard to the position by them.

Figure 6:
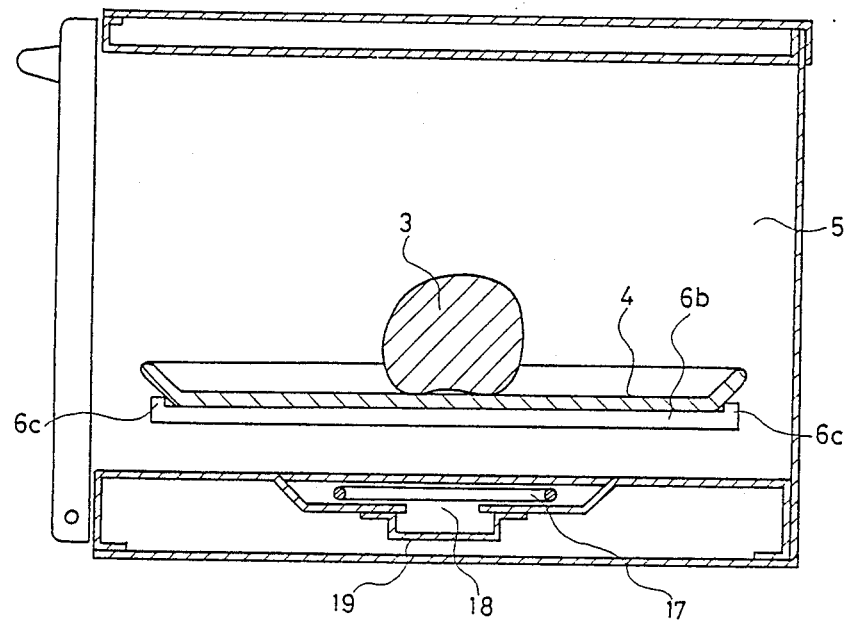

FIG. 6 shows another embodiment in which the rails 6a and 6b has convex parts 6C and 6C on their front and rear ends.

Figure 7A:
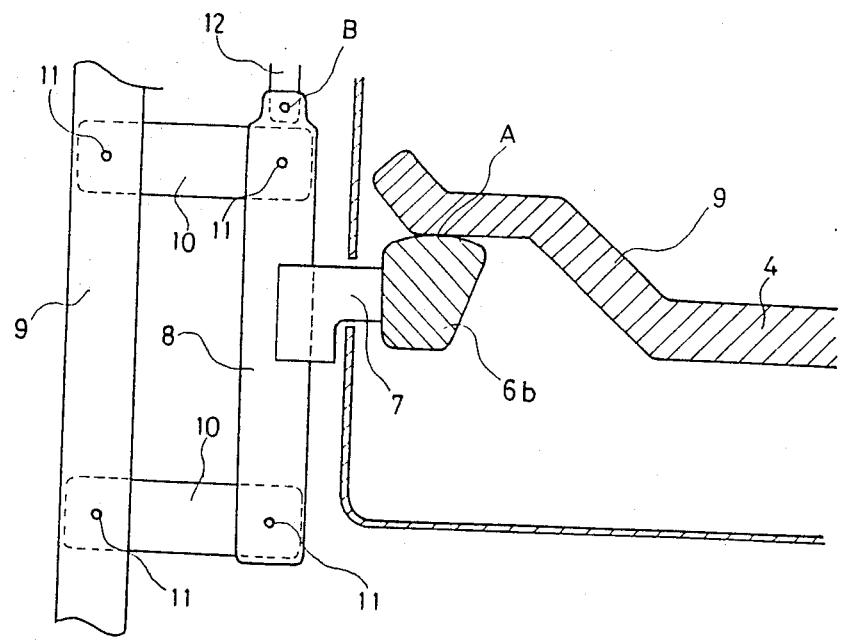
FIG. 7(a) and FIG. 7(b) are cross-sectional front view showing the principal part of a holding mechanism for holding the weight of the measurement object in accordance with the present invention.
Figure 7B:
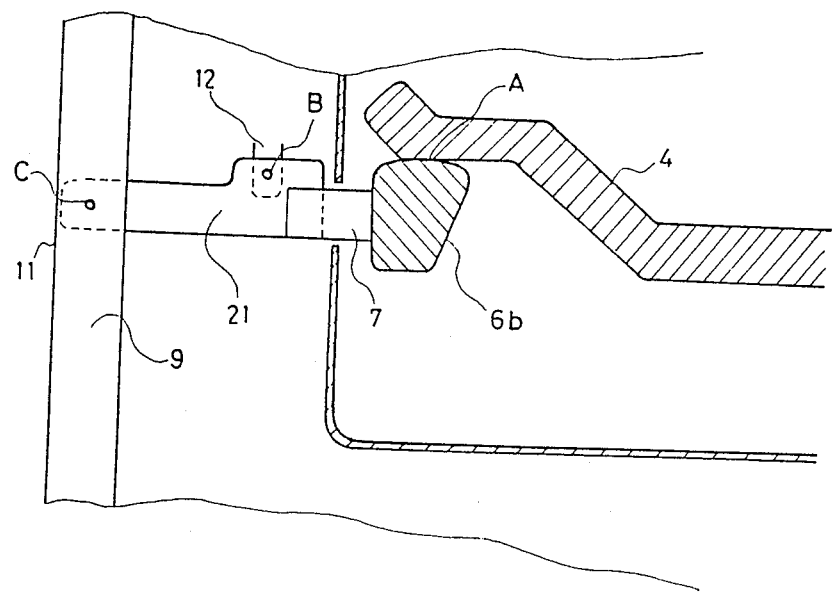

FIG. 7(a) shows a configuration where the weight of the tray is supported by the left rail 6b, and transmitted through the coupling member 7 and to the external part of the heating cavity 5, and is supported by the Roberval mechanism. The reason for adopting the Roberval mechanism in the present invention is described in the following with reference to FIG. 7(b) which shows a conventional configuration excluding a parallelogram link. In FIG. 7(b), a near horizontal lever 21 is used in place of the Roberval mechanism. The first reason to adopt the Roberval mechanism is that, in FIG. 7(a), the rail 6b, the coupling member 7 and the vertical rod 8 are moved in a vertical direction without changing its posture. And Therefore, tray 4 is laid on the rail 6b with stability. Nevertheless, in FIG. 7(b), the lever 21, the coupling member 7 and the rail 6b are rotated around the coupling pin 11 which acts as a fulcrum C. Therefore the top face of the rail 6b leans and the tray 4 encounters a danger of slipping downward. The second reason is that a slight movement of the point A on which the weight of the tray 4 is changed does not affect the weight measuring in FIG. 7(a), but effects it FIG. 7(b). Namely, in FIG. 7(a), the force charged on the vertical rod 12 does not change at all, irrespective of the changing of position of point A this advantage is a well-known characteristic of the Roberval mechanism. On the other hand, in FIG. 7(b), a lever mechanism determined by ratio of the length between points C and A versus the length between points C and B is formed around the point C as the fulcrum. Accordingly, the force on the point B is largely changed by the movement on right and left of the point A. The Roberval mechanism is adopted because of the above-mentioned two reasons.

Figure 8:
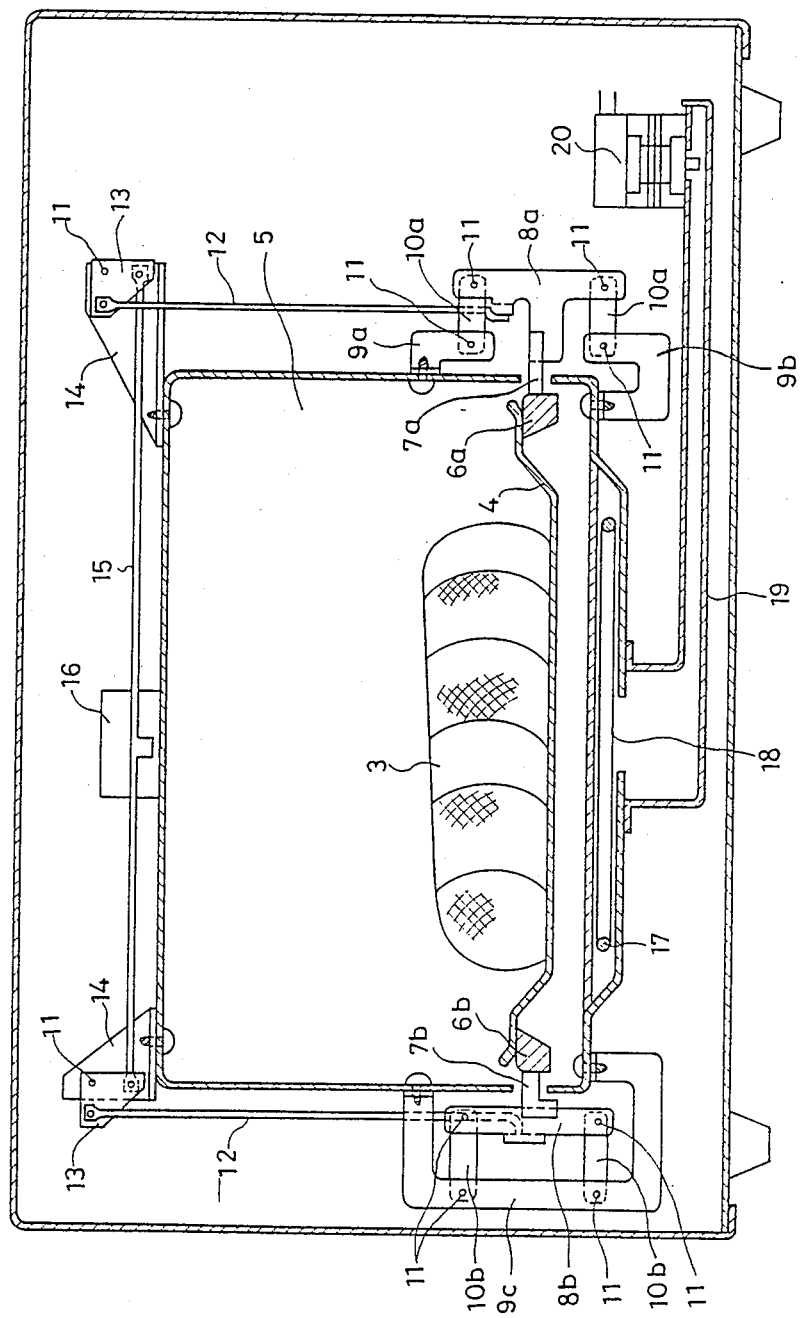
FIG. 8 is a cross-sectional front view showing an embodiment of the holding mechanism of the apparatus of FIG. 7(a).

FIG. 8 shows another embodiment. In FIG. 3, the Roberval mechanism is configured in symmetry with respect to both sides of the heating cavity 5. However, in order to attain a more precise weight measuring, the embodiment of FIG. 8 comprises a pair of Roberval mechanisms disposed in another way. Namely, the right and left Roberval mechanisms of FIG. 8 have a different shape and position of each of the elements. In the left hand Roberval mechanism, the rod 8b which moves vertically is disposed nearer to the side wall of the heating cavity 5 and the holder 9c is disposed farther from the side wall. On the contrary, the rod 8b on the right side is disposed farther from the side wall of the right hand and the upper and lower holder 9a and 9b which are of equal length to the holder 9c, are respectively disposed nearer to the side wall of the right hand.

Figure 9A:
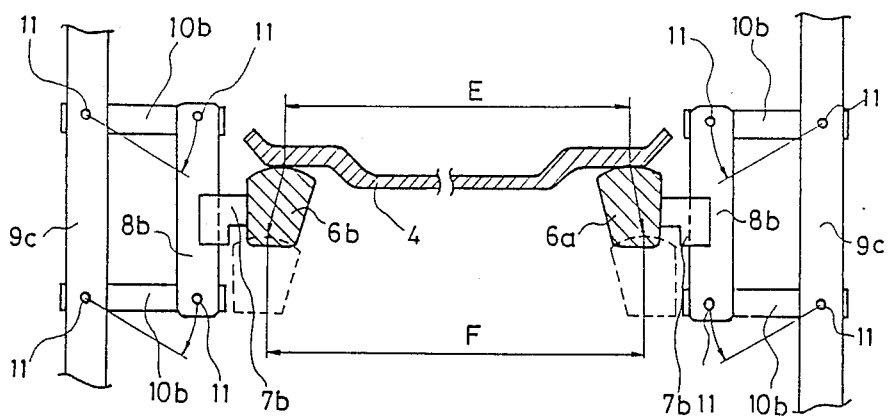
FIG. 9(a) and FIG. 9(b) are cross-sectional front views showing other embodiments of the holding mechanism, respectively.
Figure 9B:
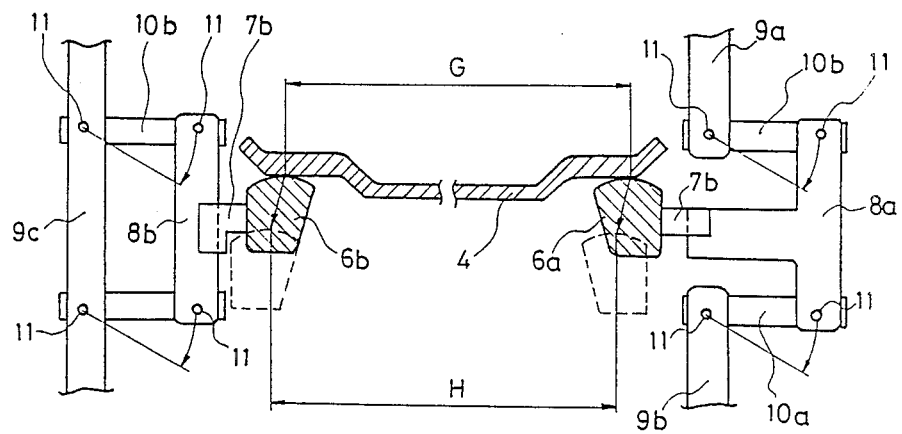

The reason why such a non-symmetrical configuration of the Roberval mechanism can measure a more precise force is described in the following with reference to FIG. 9(a) and FIG. 9(b). FIG. 9(a) shows the symmetrical configuration and FIG. 9(b) shows the non-symmetrical configuration of the Roberval mechanism. In FIG. 9(a), when the food material 3 is put on the tray 4, the rails 6a and 6b are moved down by the weight of the food material 3, and the moved positions of the rails 6a and 6b are shown by dotted line in the figure. The distance between the right rail 6a and the left rail 6b is changed from E to F shown in the figure. The relation of such distances E and F is E<F, and the distance between both the rails are widened when force is charged. Friction occurs at the contact points of the rails 6a or 6b and the tray 4. Such friction adversely influences the weight measuring. That is, due to the friction, the right and left rods 8a and 8b are not precisely applied with the weight in the vertical direction. The embodiment shown in FIG. 9(a), in which the Roberval mechanisms are symmetrically disposed on right and left sides of the heating cavity, is usually sufficient to cook for a use. But, when more precise weight measuring is attained, for instance for special purposes, the embodiment shown in FIG. 9(b) is more suitable. In this embodiment, the distance G between both rails 6a and 6b when the food stuff if not placed on the tray 4, and the distance H when the food stuff 3 is placed on the tray 4 are equal each other; namely G=H. This means that there is no friction between the contact point of the tray 4 and the rails 6a and 6b. Accordingly, a force is accurately charged on both rods 8a and 8b, which are disposed on right and left side and move parallel, so that the precise weight measuring is achievable.

Figure 10:
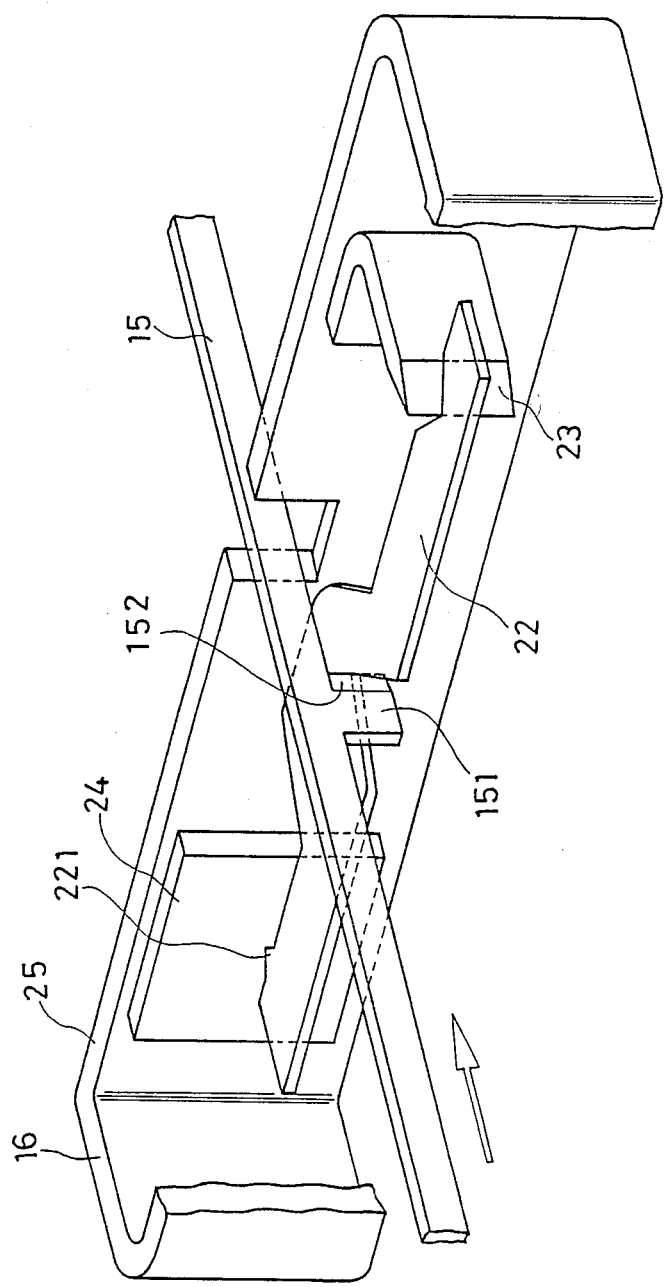
FIG. 10 is a perspective view showing the principal part of a weight measuring unit.

FIG. 10 is a perspective view showing the principal part of the weight measuring unit 16. As described in the embodiment shown in FIG. 3, the forces induced by the weight of the object are concentrated on the horizontal rod 15. In the following, the weight measuring mechanism is described.

The horizontal rod 15 is pressed by a force induced by the weight in the direction shown by an arrow, and a knife edge 152 of a protrusion 151, abutting a notch 221 pushes an intermediate part of the lever 22. One end of the lever 22 abuts the pressure sensor 24 and another end of the lever is supported by a fulcrum member 23. Accordingly, the pressure impressed on the pressure sensor 24 is a value divided by a lever ratio of the lever 22. The fulcrum member 23 and the pressure sensor 24 are precisely positioned by fixing them on the sensor base 25. The shapes of the coupling part of the horizontal rod 15 and the lever 22, the connecting part of the lever 22, and the fulcrum member 23 and the pressing part of the lever 22 by which the pressure sensor 24 is pressed, are respectively with a knife-edged shape. Specifically, the lever 22 and the pressure sensor 24 are configurated so as not to make a discrepancy of the pressing point.

Figure 11:
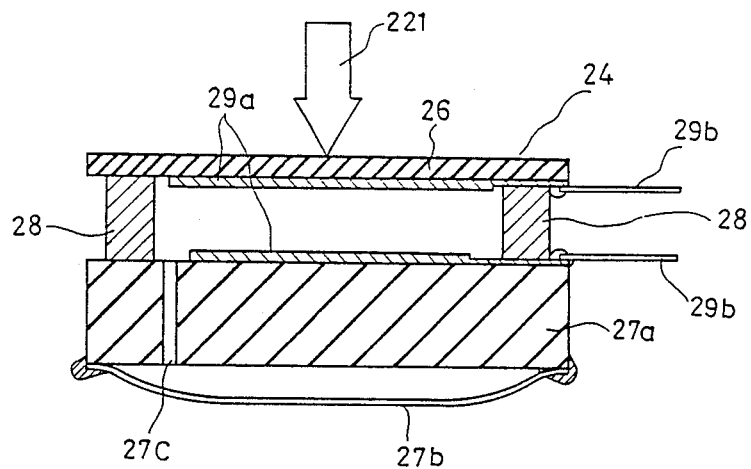
FIG. 11 is a cross-sectional front view showing detailed configuration of a pressure sensor.

FIG. 11 is a cross-sectional side view showing the constitution of the pressure sensor (capacitive load cell) 24. A sensor plate 26 is a flat plate made of an elastic insulating material having elasticity and a base plate 27a is also a flat plate made of an insulating material which may be rigid. As the insulating material, to satisfy the above-mentioned condition, ceramics or alumina (Al$_2$O$_3$) are suitable. The sensor plate 26 and the base plate 27a are bonded in parallel to have a predetermined gap therebetween by providing spacers 28 at peripheral parts. Electrodes 29a and 29a are printed on opposing surfaces of the sensor plate 26 and the base plate, and terminals 29b and 29b are connected to the electrodes 29a and 29a. When a force due to the weight of the object is impressed on the sensor plate 26 as shown by the arrow mark 221 in FIG. 11, the sensor plate 26 becomes bent, and the average distance between the sensor plate 26 and the base plate 27 changes. Accordingly, the distance between two electrodes 29a and 29a which are disposed on the sensor plate 26 and the base plate 27a, respectively, is changed and the capacitance is changed. As the bending of the sensor plate 26 is roughly in proportion to the impressed pressure, by measuring such a change of capacitance, the weight of the food material 3 in the heating cavity is measurable.

Generally, vapor is discharged from the food material in the oven, and further the oven is usually placed in the kitchen. Therefore, the humidity change is large and the average value of the humidity is high for the oven. Accordingly, it may dew on the electrode 29a, and further, absorbed dust on the electrodes may be damped. Because of such phenomena, the capacitance between the electrodes 29a and 29a may be changed. Accordingly, it is preferable to shield the air between the electrodes 29a from the open air. That is, the sensor plate 26, the base plate 27a and the spacers 28 are preferably in an air tight shield. However, since the heating oven reaches a high temperature, the air between the electrodes expands. In case the space is shielded by a hard material, the pressure between the electrodes is greatly raised by thermal expansion, and a strain is generated on the pressure plate 26. In order to solve the above-mentioned two problems, an air duct 27c is formed on the substrate 27a for ventilating the thermaly expanded air, and the opening of the air duct is made small enough not to absorb dust or dew, as shown in FIG. 11.

The above-mentioned configuration is sufficient for most uses. When more accurate measuring is demanded, an additional shielded space in which the air between the electrodes can freely flow in and out is formed and shielded from the open air. For example, a cover 27b is bonded on the substrate 27a in an airtight manner by adhesive, and the cover 27b is made of a soft or flexible material such as gum or plastic film. The air between the electrodes 29a moves freely to the additional space passing through the air duct 27c, and hence the strain of the sensor plate 26 by the change of the temperature is not influenced, an adverse influence of the humidity is reduced. Accordingly, an accurate weight measuring can be practiced.

Figure 12:
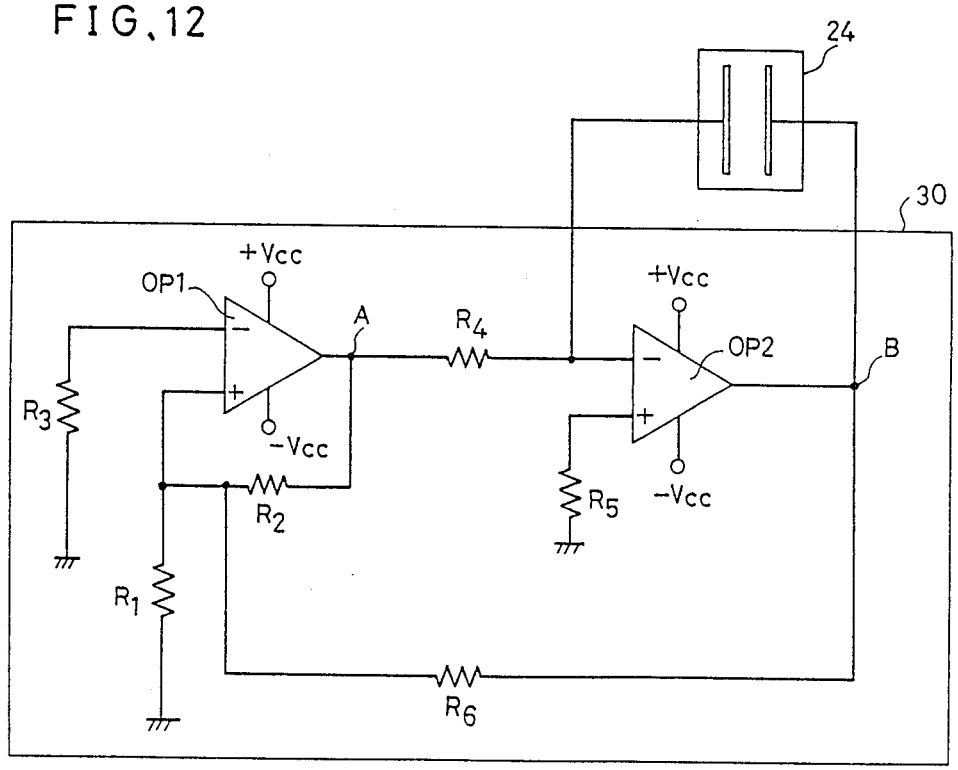
FIG. 12 is a circuit diagram showing an embodiment of oscillator to be used in the embodiment.
Figure 13A:
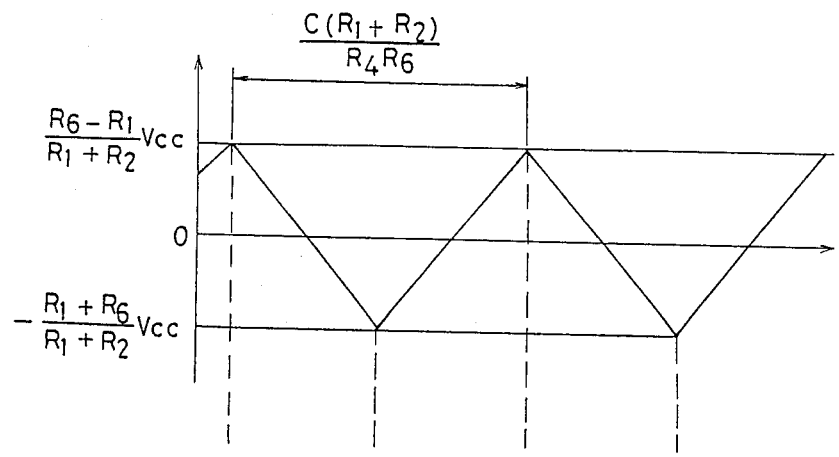
FIGS. 13(a) and (b) are diagrams showing output wave forms of the embodiment.
Figure 13B:
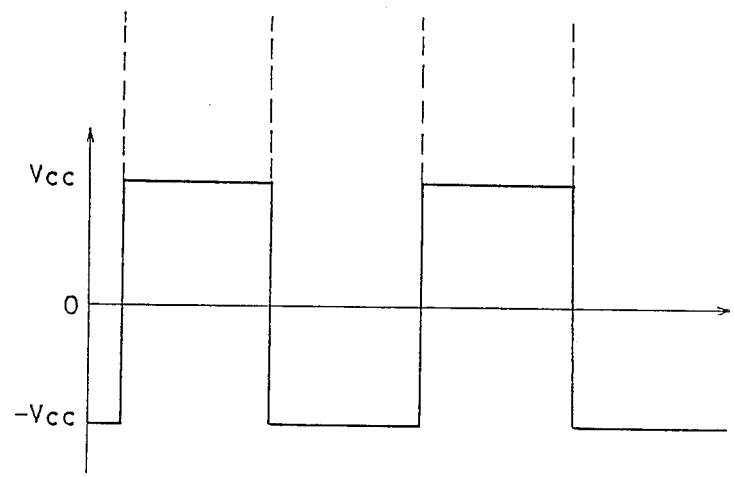

FIG. 12 shows an oscillator 30 for obtaining an oscillation frequency which changes corresponding to a change of capacitance of the pressure sensor 24. The oscillator 30 uses two operational amplifiers (hereinafter abbreviated as OP-amps) OP1 and OP2, and transforms the change of the capacitance of the pressure sensor 24 to an oscillation frequency change. Output waveforms of the OP-amps OP1 and OP2 are respectively shown in FIG. 13(b) and FIG. 13(a). FIG. 13(a) shows the waveform of point B which is an output voltage of the OP-amp OP2, and FIG. 13(b) shows the waveform of point A which is the output voltage of the OP-amp OP1. The OP-amp OP2 funcions as an integration circuit, and its input signal is the output signal of the OP-amp OP1. The OP-amp OP1 functions as a comparator circuit with a hysterisis characteristic, and its input signal is the output signal of the OP-amp OP2. The oscillator is constituted by the above-mentioned roup, and the oscillation frequency f is given as:

$$f = \frac{R_4 R_6}{C(R_1 + R_2)} \quad (1)$$

Figure 14:
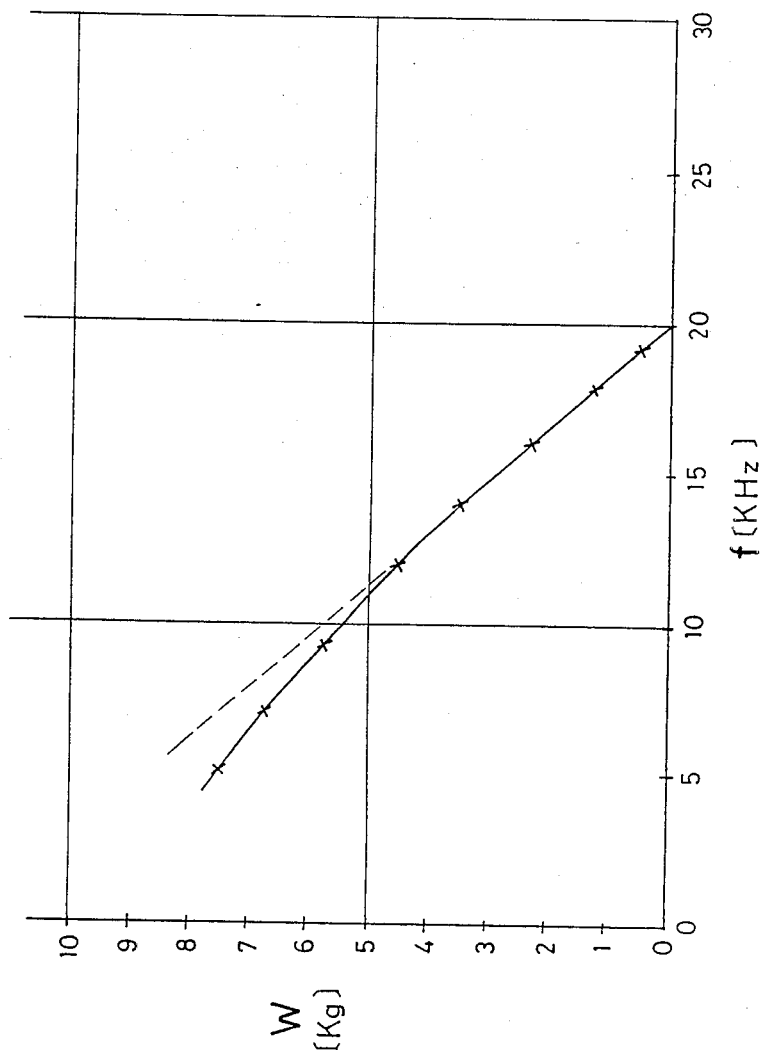
FIG. 14 is a characteristic curve showing a relation between the oscillation frequency and the weight of the measurement object.

FIG. 14 is a graph showing the relation of the oscillation frequency f and the weight W of the food material 3, and the dotted line is straight. As shown in the figure, the characteristic curve is curving. If the distance between the electrodes 29a and 29a of the pressure sensor 24 changes maintaining their parallelism, the capacitance C may be given as $$C \propto \frac{S}{d}, \quad (2)$$

and also the oscillation frequency f may be given as $$f \propto \frac{d R_4 R_6}{S(R_1 + R_2)}, \quad (3)$$

and the relation of the capacitance c and the oscillation frequency f may be shown by the straight line which is the dotted line is FIG. 14. But in practice, as the circumference of the sensor plate 26 is supported by the spacer 28, the parallel state can not be maintained. Therefore, the strain of the sensor plate 26 is curved in a manner such that displacement becomes gradually smaller from the center toward the circumferencial part. Accordingly, the characteristic curve becomes as shown by the curved solid line in FIG. 14.

Figure 15:
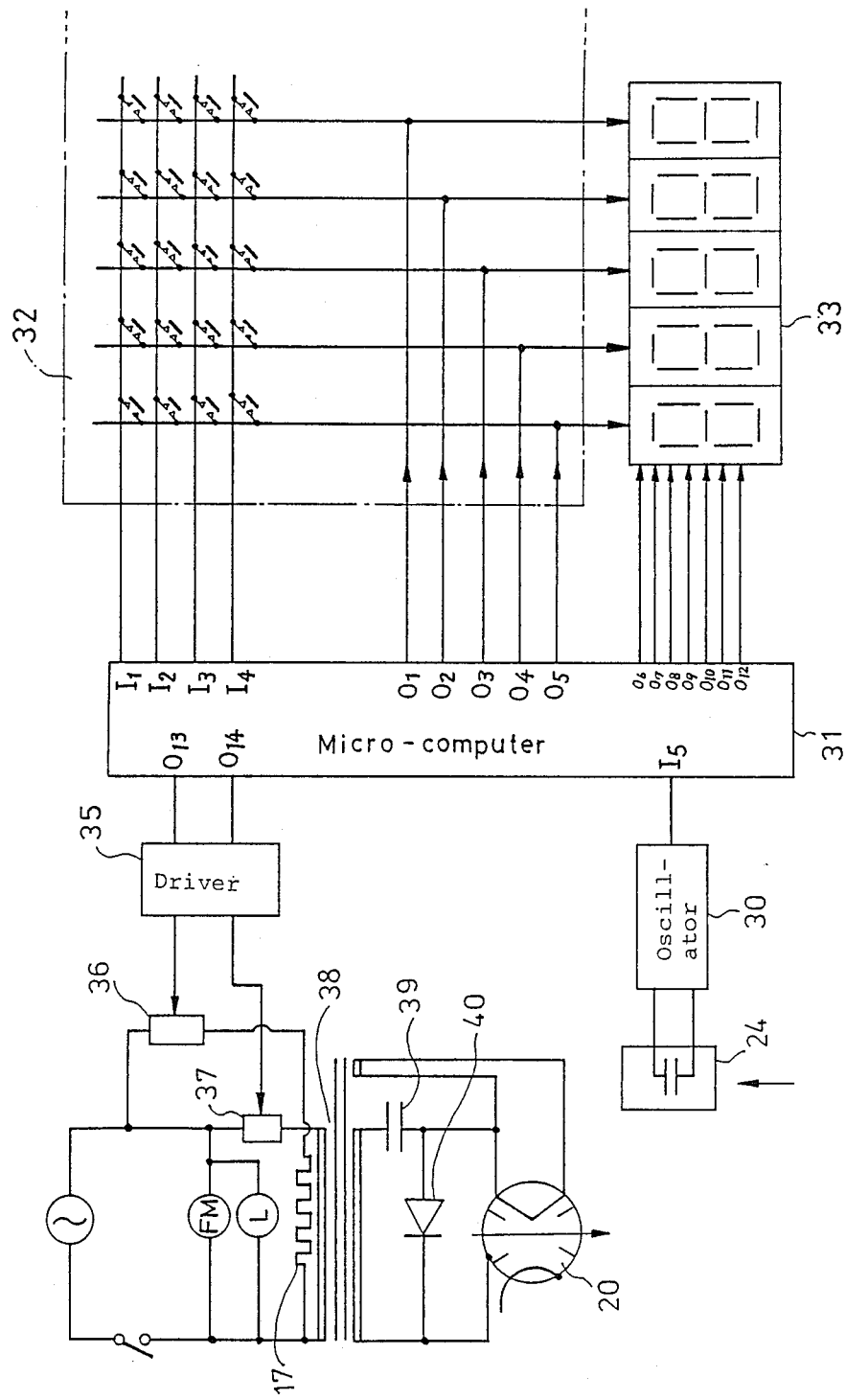
FIG. 15 is a circuit diagram of control circuit of the embodiment of the present invention.

FIG. 15 is a circuit diagram showing an embodiment of a control circuit of the heating oven having the weighing apparatus in accordance with the present invention. A main part of the control circuit is constituted by a micro-computer 31, inputted on input terminals $I_1$, to $I_4$ of the micro-computer 31 from operational input port 32, are decoded in the micro-computer 31 and indicated on an indicator 33. The pressure sensor 24 is impressed with a force induced by the weight of the food material 3. The capacitance of the pressure sensor 24 changes in proportion to the weight. The oscillation frequency f by the oscillator 30 depends on this capacitane and the micro-computer 31 counts the frequency f. In the micro-computer 31, the relation of the frequency f and the weight w shown in FIG. 14 is memorized. Such a relation is approximated as a quadratic equation, so that the weight w is calculated as $$W = Af^2 + Rf + C \quad (4).$$

In the micro-computer 31, most suitable heating power, heating time and heating mode as a function of the weight of the food material have been memorized, and the micro-computer 31 outputs control signals to a driver 35 for controlling the magnetron 20 and the heater 34. The driver 35 is connected to a relay 36 for controlling the heater 34, and to a relay 37 for controlling the magnetron 20. The magnetron 20 is oscillated by an oscillation circuit comprising a high-voltage transformer 38, a high-voltage capacitor 39 and a high-voltage diode 40.

What is claimed is:

1. A weighing apparatus comprising:
   a tray for holding an object to be weighed thereon;
   a capacitive load cell having at least one insulative elastic member for receiving a load applied thereon;
   a pair of opposing electrodes, one of which is disposed on a surface of said insulative elastic material;
   casing means for covering said pair of electrodes in an air-tight manner so that they are not influenced by the outer atmosphere;
   linkage means for conveying a load induced by and responding to a weight of said object onto said insulative elastic member to induce a displacement of said one electrode; and
   capacitance measuring means for measuring a capacitance between said pair of electrodes.

2. A weighing apparatus in accordance with claim 1, wherein
   said insulative elastic member is a thin ceramic plate having said one electrode thereon.

3. A weighing apparatus in accordance with claim 1, wherein
   said casing means has at least one air opening for allowing a passage of air therethrough.

4. A weighing apparatus in accordance with claim 1, wherein
   said capacitive load cell has a space in said casing, isolated from an outside of said casing means, wherein thermally expanded air existing between said pair of electrodes is freely evacuated.

5. An oven comprising:
   a heating cavity for containing a heating object therein;

heater means for applying energy to said heating object to thereby heat said object;

a tray for holding said heating object thereon;

a pair of beam shaped holders for holding said tray, to receive a load induced by and responding to a weight of said heating object on said tray;

a capacitive load cell, operatively coupled to said beam-shaped holders and disposed above said heating cavity, for receiving said load applied thereon and for varying a capacitance thereof based on said load;

a pair of linkages disposed penetrating through said side walls of said heating cavity to contact said beam shaped holders, for conveying said load on said beam-shaped holders to said capacitive load cell; and a capacitance measuring circuit for measuring a variation of capacitance of said capacitive load cell.

6. An oven in accordance with claim 5, wherein said tray is slidable on said beam shaped holders for being taken out from said heating cavity.

7. An oven in accordance with claim 5, wherein said linkage is made of a material which is not affected by microwaves.

8. An oven in accordance with claim 5, wherein said linkage is disposed through side walls of said heating cavity.

9. An oven in accordance with claim 5, wherein said beam shaped holders are disposed such that they do not contact a bottom face of said heating cavity when said heating object has a maximum allowable weight to be measured.

10. An oven in accordance with claim 5, wherein said heater means is disposed below said heating cavity.

11. An oven in accordance with claim 5, wherein two offset parts are formed on right and left sides of said tray for guiding and positioning said tray when said tray is put along said beam-shaped holders and two connecting parts are formed respectively on said tray for fitting said two offset parts at lying on said beam-shaped holders.

12. An oven in accordance with claim 11, wherein a distance between said two offset parts of said tray for guiding said tray by said beam-shaped holders, is selected to be narrower than distance between said two beam-shaped holders.

13. An oven in accordance with claim 11, wherein a width of said connecting part is narrower than a distance from a side wall of said heating cavity to a contacting part between said beam-shaped holder and said offset part of said tray.

14. An oven in accordance with claim 11, wherein a total width of distance between said two offset parts and a width of one connecting part is larger than a distance of said two beam-shaped holders.

15. An oven in accordance with claim 5, wherein said beam-shaped holders include convex parts formed thereon for positioning said tray in said heating cavity in a direction along said beam-shaped holders.

16. An oven in accordance with claim 15, wherein said tray has convex parts formed integrally thereto in a manner to prevent contacting of said tray with a rear wall of said heating cavity or a front door, by abutting of said convex parts on said beam-shaped holders.

17. An oven in accordance with claim 15, wherein said beam includes convex parts formed thereon in such a manner to prevent contacting of said tray with a rear wall of said heating cavity or a front door, by abutting of said tray on said convex parts of said beam holders.

18. An oven comprising:

a heating cavity for containing a heating object therein;

heater means for applying energy to said heating object thereby to heat said object;

a tray for holding said heating object thereon;

a pair of beam-shaped holders, one disposed on each side of said heating cavity, for holding said tray, thereby to receive a load induced by and responding to a weight of said heating object on said tray;

a pair of linkages disposed penetrating through side walls of said heating cavity to contact with said beam shaped holders for conveying said load to an external part of said heating cavity, plural holding mechanisms, one disposed on each side of said heating cavity, for receiving a force conveyed by said linkages, wherein said holding mechanisms are constituted in a parallelogram construction, one side being fixed and another side parallel thereto being movable;

a load cell for measuring a load conveyed by said holding mechanisms; and control means for controlling said heater means responding to a weight of said heating object measured by said load cell.

19. An oven in accordance with claim 18, wherein said beam-shaped holders and said Roberval mechanisms are disposed on both side of said heating cavity.

20. An oven in accordance with claim 18, wherein forces conveyed by said plural holding mechanisms is measured by concentrating one point.

21. An oven in accordance with claim 18, wherein movable elements of said holding mechanisms are disposed on a nearer side to said heating cavity, and fixed elements of said holding mechanisms are disposed on a farther side from said heating cavity.

22. An oven in accordance with claim 18, wherein a movable element is disposed in a nearer side of said heating cavity and a fixed element is disposed in a farther side from said heating cavity in one of said holding mechanisms, and another movable element is disposed in a farther side from said heating cavity and a fixed element is disposed in a near side to said heating cavity in another of aid mechanisms.

* * * * *